March 15, 1955 WILLIAM IEU-LIANG WU 2,704,323

TRANSMITTER FREQUENCY CONTROL SYSTEM

Filed July 9, 1945

INVENTOR.
WILLIAM IEU-LIANG WU
BY
William D. Hall
ATTORNEY

United States Patent Office 2,704,323

Patented Mar. 15, 1955

2,704,323

TRANSMITTER FREQUENCY CONTROL SYSTEM

William Ieu-Liang Wu, New York, N. Y., assignor to the United States of America as represented by the Secretary of War Application July 9, 1945, Serial No. 604,065

10 Claims. (Cl. 250—17)

This invention relates to radio communication systems and more particularly to systems for transmitting signals in response to received information.

In many applications it is desirable to provide means for determining the frequency of a received signal and transmitting a predetermined signal in response to said received signal. It is also desirable in many instances to hold the transmitter inoperative in the absence of a received signal. It is apparent that the above mentioned operations may be performed if a transmitter and receiver are provided for each frequency channel in which signals may be received, and an operator is present to adjust the transmitter and receiver and to turn off the transmitter when no signal is received. Such a system obviously has many disadvantages.

It is an object of the present invention, therefore, to provide a simple, novel means for determining the frequency of a received signal and transmitting a predetermined signal in response to said received signal.

It is a further object of this invention to provide means for rendering the transmitter inoperative in the absence of a received signal.

In accordance with the present invention there is provided a radio circuit wherein the D.-C. voltage obtained from the discriminator of the receiver during a "receive" period is stored and the frequency of the transmitter is automatically adjusted until the discriminator output due to the transmitted signal very nearly matches that in the storage device due to the received signal.

The radio system has a receiver the acceptance band of which is broad enough to cover the frequency range to be searched. This receiver produces an output voltage which is determined by the frequency of a received signal, and a transmitter is provided the frequency of which depends upon the receiver output voltage. Periodically, the transmitter operation is interrupted and the receiver output is connected to a voltage storing or retaining device. In the absence of a received signal, there will be no voltage stored, and means is provided for suppressing transmitter operation during the subsequent "transmit" period under such circumstances. Should there be a received signal, however, the output voltage of the receiver will be stored as a measure of the frequency of the received signal. When the transmitter is next rendered effective, its frequency will be varied automatically until the voltage output of the receiver due to signal from the transmitter very nearly equals the stored voltage. In this way, the transmitter frequency is caused to coincide substantially with that of the received signal. Transmitter operation is interrupted when the received signal disappears.

For a better understanding of the invention, reference is made to the following detailed description and to the drawings, in which.

Figures 1, 2:
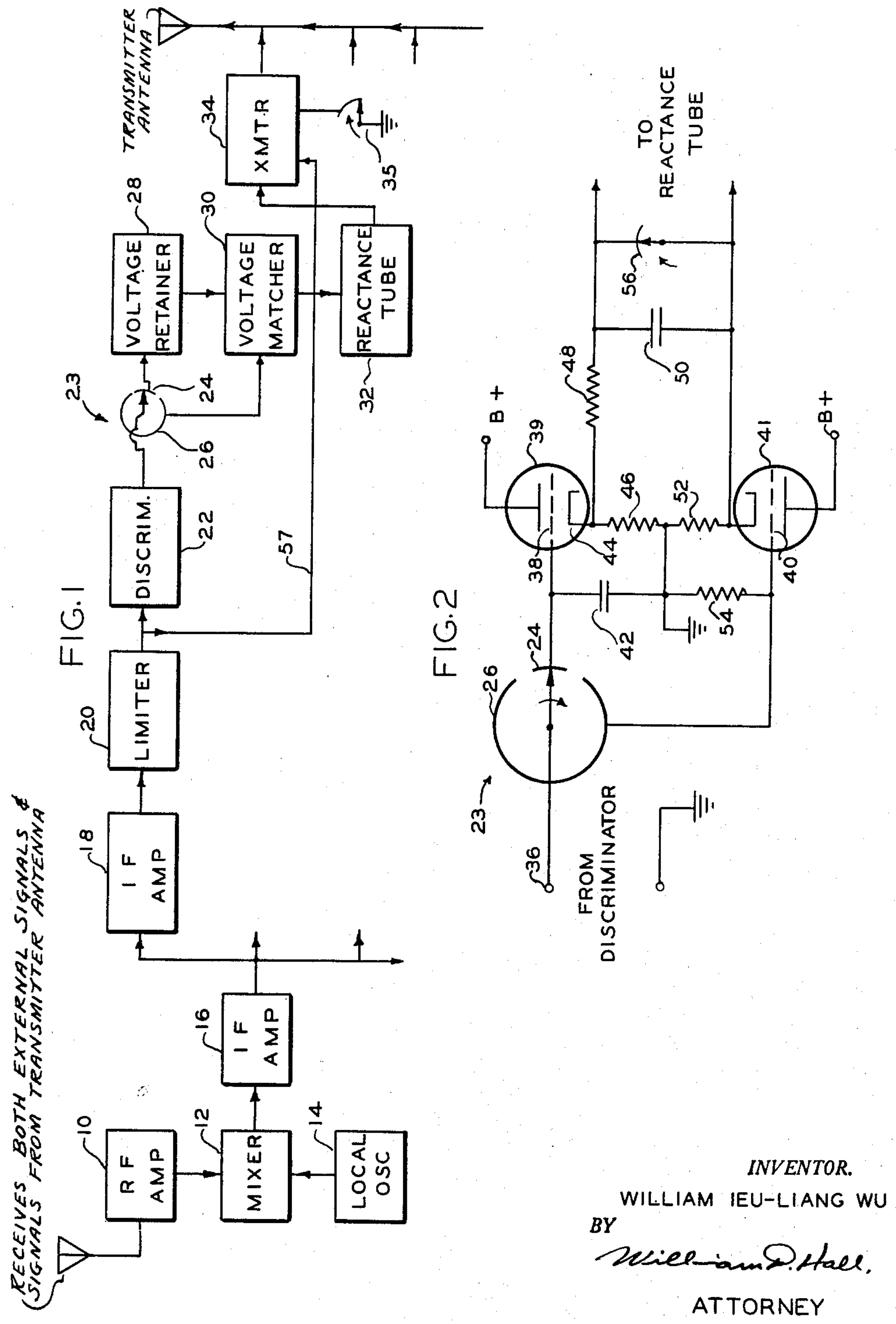
Fig. 1 is a block diagram of a preferred embodiment of the invention.
Fig. 2 is a detailed wiring diagram of a preferred form of voltage storing device and a voltage supplying device for determining the transmitter frequency.

In Fig. 1, broad-band receiver 10, mixer 12 and intermediate-frequency amplifier 16 are shown, together with a local oscillator 14, the frequency of which is maintained constant. Received signals within the radio-frequency range to be searched will produce beat frequencies within the intermediate-frequency range. This range may be divided into multiple channels. In any one channel, an intermediate-frequency amplifier 18 drives a limiter 20 and discriminator 22. A rotary switch 23 has contact segment 24, effective during the "receive" period, and contact segment 26, effective during the "transmit" period. Voltage storing means or retainer 28 may be simply a capacitor which is charged when switch 23 is in the "receive" period. This will be explained more fully hereinafter in connection with Fig. 2. Voltage matcher 30 provides an output voltage for the reactance tube 32 which rises until the voltage into the voltage matcher from segment 26 is very nearly equal to the previously applied voltage at segment 24. Reactance tube 32 controls the frequency of transmitter 34. Each channel has a separate oscillator for the transmitter as 34, or the transmitter may be simply a power oscillator. This transmitter is normally inoperative, but is tripped into sustained operation (for any cycle of switch 23) when an output appears at some point in the related channel, as for example at limiter 20. Means, such as rotary switch 35, are provided for interrupting the operation of the transmitter cyclically just before switch 23 reaches the "receive" position. The switches 23 and 35 may rotate once every $1/10$ second, and the "receive" period may be $1/100$ second while $9/100$ second may be allotted for the transmission period. During the intervals in which the transmitter is operated, signals transmitted thereby, will, of course, be received at R. F. amplifier 10 in the same manner as any other signals. The term "received signal", however, as used herein generally denotes a signal originating elsewhere than at a transmitter such at 34 included within the disclosed system, except where the context indicates otherwise.

In Fig. 2, there are shown the details of the voltage retainer and matcher which constitute a preferred embodiment of a device for applying to the reactance tube (or like device) a voltage determining the frequency of the transmitter which should be equal to the frequency of the received signal. The remainder of the components of this are well known and hence further detailed description thereof is omitted.

A signal appears at input terminal 36 from the discriminator and is applied through "receive" contact 24 and "transmit" contact 26 alternately to capacitor 42 and to the grid 40 of a cathode follower 41. Capacitor 42 is connected between contact 24 and ground to be charged by the discriminator output, being adapted to retain this charge for application to grid 38 during the "transmit" interval. Grid 38 of a cathode follower 39 is also connected to contact 24. Between cathode 44 of the follower 39 and ground there is provided the cathode resistor of the follower 39. The output of cathode follower 39 is applied through a current-limiting resistor 48 in series with a capacitor 50 from which a return path to ground is provided through the cathode resistor 52 of cathode follower 41. Grid 40 is provided with grid-return resistor 54. Rotary switch 56 is ganged with switch 23 and is closed only while the latter switch is in the "receive" position. The plates of both cathode-follower tubes 39 and 41 are connected to B+.

It is believed that the operation of the system in Fig. 1 will be understood from the above description. Discriminator 22 yields an output voltage which is impressed on terminal 36, Fig. 2, while switches 23 and 56 are in the "receive" position as shown, and capacitor 42 is charged to a potential indicative of the frequency deviation of the received signal from a predetermined reference frequency. Capacitor 50 is maintained in a discharged condition by switch 56, which is closed at this time, so that zero voltage is impressed on the reactance tube which controls the transmitter frequency.

It may be assumed that the greatest contemplated frequency deviation of the incoming signal with respect to the frequency at which the transmitter oscillator of any one channel operates with zero reactance-tube input voltage is of such magnitude as to produce a 30-volt output from the discriminator. The amount of input to the reactance tube required to cause a shift in transmitter frequency to a value such as will yield a 30-volt discriminator output may be merely one volt. In an assumed example, capacitor 42 may be charged to 15 volts upon reception of an incoming signal. Capacitor 50 remains short-circuited by switch 56 until the discriminator is connected to contact segment 26 and grid 40. The fifteen volts impressed on grid 38 by capacitor 42 causes substantially a 15-volt change in potential to appear across cathode-follower resistor 46. This voltage is impressed on the circuit including capacitor 50, current-limiting resistor 48, and cathode-follower resistor 52. (The normal zero-input bias across resistor 46 is balanced by that across resistor 52.) The charging rate of capacitor 50 is held very low by means of resistor 48. However, the first slight rise in voltage across capacitor 50 is impressed on the reactance tube to cause a quickly changing transmitter frequency. This transmitted signal is received and passes through the receiver to the discriminator and to control grid 40. Charging of capacitor 50 to one-quarter of a volt would result in a transmitted frequency change that may cause seven volts or more to appear at grid 40. This produces a voltage change across resistor 52 which bucks that across resistor 46 and diminishes the charging rate of capacitor 50.

The ultimate result is that the voltage across resistor 54 very nearly approaches that across capacitor 42. At this point, the transmitter frequency is very nearly that of the received signal since the transmitted signal produces almost the same discriminator output as was produced by the received signal, and that output depends only on the frequency deviation from a predetermined reference frequency. The voltage change across resistor 52 may be 14.5 volts when there is a 0.5-volt drop across capacitor 50 and a voltage change of 15 volts across resistor 46. There is consequently a slight mismatch in frequency between the transmitted and the received signals. This is only $\frac{1}{30}$ of one-half of the band subdivision in the assumed example for a signal of greatest deviation, and may be at most a mere 8.3 kilocycles if the band to be covered is 47–52 megacycles and each intermediate frequency channel is 500 kilocycles wide. This difference and that due to leakage of capacitor 42 may be compensated by various circuit expedients if regarded necessary. The ratio of the discriminator output to the reactance-tube control voltage for a signal of greatest deviation may even be made 100:1 through proper reactance tube circuit design, and in that event the difference would be only 2.5 kilocycles.

Capacitor 42 discharges through discriminator 22 when switch 23 is in the "receive" position when there is no longer a received signal; otherwise its charge is renewed to that value determined by the received signal during each "receive" period.

When there is no frequency deviation, there is no discriminator output, and either of two conditions obtains. There may be a received signal which is at the predetermined resting frequency of the channel. Also, there may be no signal received. In the latter event, it is wasteful to operate the transmitter. Therefore, the transmitter may be designed as normally quiescent, and a connection may be provided between some part of the receiver between the antenna and the discriminator to trip the transmitter into operation only when there is a received signal. Consequently, a received signal coinciding with the center or resting frequency of the channel will produce a response from the transmitter, whereas the transmitter will be idle when there is no received signal. Where the receiver is divided into multiple channels, there is provided a connection 57 in advance of the discriminator in that channel to the transmitter for the purpose of tripping it when any signal is received.

The use of a capacitor for storing the discriminator output voltage is based on the presumption that the received signal has a sustained carrier. If a series of pulses is anticipated, a more elaborate, peak-voltage retaining means should be used. One such arrangement simply includes a rectifier in series with the capacitor. This necessitates addition of means, such as a rotary switch, for discharging the capacitor just prior to each "receive" period. If this form of peak-voltage retaining means is adopted, the discriminator output need comprise only unidirectional pulses. Generally speaking, the frequency coverage per channel is cut in half in this type of operation. This is not necessarily a disadvantage since each channel includes only one oscillator which constitutes or drives the transmitter and which will, therefore, reply to only one received signal. Multiplying the channels multiplies the capacity of this system for responding to additional signals.

Compared with other recently developed systems for automatically responding to received signals, this system has the notable advantage of eliminating search periods which are long compared with transmitter operation periods. Furthermore, the search period of this receiver covers the entire band at once and not progressively. This reduces the chance of missing signals made up of high-frequency pulses of short duration. It is also significant that a check of the transmitter frequency is made against a stored voltage representing the received signal frequency.

While there has been described what is at present considered the preferred embodiment of the invention, it will be obvious to those skilled in the art that various changes and modifications may be made therein without departing from the invention.

What is claimed is:

1. An improved radio frequency control system comprising a receiver having a discriminator adapted to yield a direct-current output determined by the frequency of a received signal, voltage retaining means, a transmitter, means jointly controlled by said retaining means and said discriminator for determining the frequency of said transmitter, and means to switch the discriminator alternately to the voltage retaining means and to the frequency determining means, whereby the stored voltage representative of the received signal frequency constitutes a check for the transmitted frequency.

2. A system according to claim 1, in which means is provided for interrupting operation of said transmitter while said discriminator is shifted to said voltage retaining means.

3. A system of controlling the frequency of a variable frequency radio transmitter comprising means for storing a direct-current voltage representative of the desired transmitter frequency, means for applying a progressively changing voltage to a frequency-determining portion of the transmitter, means for converting the transmitted signal frequency to a direct-current voltage representation thereof, means for comparing the stored and converted voltage representations, and means for limiting the progressively changing voltage as determined by the comparison.

4. An improved radio frequency control system comprising a receiver for receiving a range of frequencies, said range including at least one given band of frequencies, a channel for such a given band of frequencies including a transmitter for transmitting at a frequency in said given band, said channel being connected to said receiver, and means for synchronizing the frequency of said transmitter with the frequency of a received signal in said band, said received signal originating remotely from said transmitter; said frequency synchronizing means including means effective in yielding a direct current output determined by the frequency of signals received by said receiver, voltage retaining means, means controlled by both said retaining means and said direct current output means for determining the frequency of said transmitter, means to switch in alternation the direct current output means, alternately representing said remote and said transmitter frequency, to the voltage retaining means and to the frequency determining means, and means for interrupting the operation of said transmitter while said direct current output means is switched to said voltage retaining means.

5. A system according to claim 4 wherein said range of frequencies includes a plurality of said given frequency bands, wherein said receiver includes means for separating said given frequency bands, and wherein said channel is provided for each of said given frequency bands.

6. A system as defined in claim 4, further comprising means coupled to said receiver and to said transmitter for effecting the operation of said transmitter only when a signal is being received in said given frequency band.

7. A system according to claim 4 wherein said frequency determining means includes means for matching a first direct current voltage representing the frequency of a received remote signal with a second direct current voltage representing the transmitter frequency, and a reactance tube for controlling the frequency of said transmitter in response to the difference existing between said first and second voltages.

8. Apparatus for synchronizing the frequency of an intermittently operative transmitter with the frequency of a remote signal received by a receiver, said receiver yielding a direct current output determined by the frequency of the signals received thereby; said apparatus including a voltage retaining means, means controlled by both said retaining means and said direct current receiver output for determining the frequency of said transmitter, and means to switch in alternation the direct current receiver output alternately representative of said remote and said transmitter signals to the voltage retaining means and to the frequency determining means, whereby the retained voltage representative of the received signal frequency constitutes a check for the transmitted frequency.

9. In an apparatus for synchronizing the frequency of a transmitter having a reactance tube for control of the frequency thereof with the frequency of a remote signal received by a receiver, said receiver yielding a direct current output determined by the frequency of the signals received thereby, the circuit for controlling said reactance tube comprising voltage retaining means, a first cathode follower having its output controlled by said voltage retaining means, a second cathode follower having its output controlled by said direct current receiver output, said cathode followers having output circuits connected in opposition to provide a difference voltage, and means to switch the direct current receiver output alternately to said voltage retaining means and to said second cathode follower, a serially connected resistor and a reactance element connected to shunt said output circuit, and means for shorting out said reactance element when said receiver output is switched to said voltage retaining means, the voltage across said reactance element controlling said reactance tube.

10. A frequency control system for adjusting the operating frequency of a local radio transmitter which radiates a first signal, to the frequency of a remotely radiated second signal, comprising a radio receiver for receiving radiant energy arranged to alternately receive the first and second signals, means in said receiver for producing an output representative of the frequency of the signal being received thereby, a comparison circuit, means for alternately applying to said comparison circuit the outputs from said receiver representing respectively the frequency of each of said two signals, and means controlled by said comparison circuit for tuning said local transmitter substantially to the frequency of said second signal.

References Cited in the file of this patent

UNITED STATES PATENTS

| | | |
|---|---|---|
| 1,944,315 | Clapp | Jan. 23, 1934 |
| 2,419,527 | Bartelink | Apr. 29, 1947 |